US012064658B2

(12) United States Patent
Cirilli et al.

(10) Patent No.: US 12,064,658 B2
(45) Date of Patent: Aug. 20, 2024

(54) FIRE DETECTION AND SUPPRESSION SYSTEM WITH HIGH TEMPERATURE CONNECTOR

(71) Applicant: Tyco Fire Products LP, Landsdale, PA (US)

(72) Inventors: Patrick Scott Cirilli, Peshtigo, WI (US); Donald M. Bjorkman, Menominee, MI (US)

(73) Assignee: Tyco Fire Products LP, Cranston, RI (US)

( * ) Notice: Subject to any disclaimer, the term of this patent is extended or adjusted under 35 U.S.C. 154(b) by 465 days.

(21) Appl. No.: 17/413,883

(22) PCT Filed: Dec. 16, 2019

(86) PCT No.: PCT/IB2019/060870
§ 371 (c)(1),
(2) Date: Jun. 14, 2021

(87) PCT Pub. No.: WO2020/128799
PCT Pub. Date: Jun. 25, 2020

(65) Prior Publication Data
US 2022/0062679 A1 Mar. 3, 2022

Related U.S. Application Data

(60) Provisional application No. 62/780,538, filed on Dec. 17, 2018.

(51) Int. Cl.
*A62C 37/44* (2006.01)
*A62C 3/00* (2006.01)

(52) U.S. Cl.
CPC .............. *A62C 37/44* (2013.01); *A62C 3/006* (2013.01)

(58) Field of Classification Search
CPC ......... A62C 3/006; A62C 35/11; A62C 35/13; A62C 37/36; A62C 37/44; A62C 37/46; A62C 37/48
See application file for complete search history.

(56) References Cited

U.S. PATENT DOCUMENTS 3,584,688 A * 6/1971 Duncan .................. A62C 3/006 169/59
4,580,638 A * 4/1986 Jones ..................... A62C 3/006 169/59

(Continued)

FOREIGN PATENT DOCUMENTS

CN 101095598 A 1/2008
CN 101291707 A 10/2008

(Continued)

OTHER PUBLICATIONS

International Search Report and Written Opinion received for International App.No. PCT/IB2019/060870, dated Jun. 9, 2020, 11 pages.

(Continued)

*Primary Examiner* — Darren W Gorman
(74) *Attorney, Agent, or Firm* — Foley & Lardner LLP

(57) ABSTRACT

A fire detection and suppression system includes a first linear heat detector configured having a first activation temperature, a second linear heat detector having a second activation temperature different than the first activation temperature, a connector assembly electrically coupling the first linear heat detector and the second linear heat detector, a source of fire suppressant at least selectively coupled to at least one nozzle, and a controller coupled to the first linear heat detector and the second linear heat detector and configured to initiate distribution of the fire suppressant through the at least one nozzle in response to receiving an activation signal. The activation signal indicates at least one of (a) the (Continued)

first linear heat detector has reached the first activation temperature or (b) the second linear heat detector has reached the second activation temperature. The connector assembly is configured to be positioned within the ventilation hood.

16 Claims, 10 Drawing Sheets

(56) References Cited

U.S. PATENT DOCUMENTS

| | | | | |
|---|---|---|---|---|
| 4,830,116 | A * | 5/1989 | Walden | A62C 2/04 169/17 |
| 4,979,572 | A * | 12/1990 | Mikulec | A62C 3/006 239/524 |
| 5,186,260 | A | 2/1993 | Scofield | |
| 5,351,760 | A | 10/1994 | Tabor, Jr. | |
| 6,341,655 | B1 * | 1/2002 | Busian | A62C 2/04 169/59 |
| 2006/0272832 | A1 | 12/2006 | Biehl | |
| 2007/0246234 | A1 * | 10/2007 | Vegso | A62C 37/12 169/59 |
| 2008/0053426 | A1 | 3/2008 | Erdmann | |
| 2009/0294141 | A1 * | 12/2009 | Rouse | A62C 3/006 169/65 |
| 2010/0238973 | A1 | 9/2010 | Gilchrist et al. | |
| 2011/0147017 | A1 * | 6/2011 | Saglam | A62C 3/006 169/65 |
| 2018/0031427 | A1 | 2/2018 | Fujisawa et al. | |
| 2018/0169450 | A1 * | 6/2018 | Moffa | G08B 29/145 |

FOREIGN PATENT DOCUMENTS

| | | | |
|---|---|---|---|
| CN | 104520648 | A | 4/2015 |
| CN | 105333478 | A | 2/2016 |
| CN | 107545692 | A | 1/2018 |
| CN | 207704600 | U | 8/2018 |
| JP | H09-313637 | A | 12/1997 |
| JP | 2010-217177 | A | 9/2010 |
| JP | 2016-200452 | A | 12/2016 |
| KR | 2004-0084318 | A | 10/2004 |
| KR | 20130015056 | A | 2/2013 |
| KR | 101389541 | B1 | 4/2014 |
| KR | 101460169 | B1 | 11/2014 |
| KR | 2016-0004022 | U | 11/2016 |
| KR | 101713232 | B1 | 3/2017 |
| WO | WO-2008/104105 | A1 | 9/2008 |
| WO | WO-2016/024267 | A1 | 2/2016 |

OTHER PUBLICATIONS

ProtectOWire Fire Systems, "ProtectOWire Field Serviceable Connector Model No. PWSK-3", Nov. 14, 2013, 1 page.

Lanfang et al., "Design of Electrical Systems for Aerodynamic Missiles," China Astronautic Publishing House, published Aug. 31, 2009 [Chapter 5 Selection of Power Grid Elements Zhang Xingxin] (p. 78).

Li et al., "Dictionary of Modern Material Science and Engineering," Shandong Science and Technology Press, published Aug. 31, 2001 (4 pages).

* cited by examiner

FIRE DETECTION AND SUPPRESSION SYSTEM WITH HIGH TEMPERATURE CONNECTOR

CROSS-REFERENCE TO RELATED PATENT APPLICATION

This application claims the benefit of U.S. Provisional Application No. 62/780,538, filed Dec. 17, 2018, which is incorporated herein by reference in its entirety.

BACKGROUND

The present disclosure relates generally to fire suppression systems. More specifically, the present disclosure relates to fire suppression systems for use with linear heat detectors.

Linear heat detectors may be used in connection with fire detection. The heat detectors have a characteristic known as activation temperature. The heat detectors include two conductive cores separated by an outer material. When the heat given off by a fire meets or exceeds the activation temperature of the linear heat detector, the outer material of the detector melts. The internal conductive cores contact each other and cause a circuit to short. The shorted circuit signals an elevated temperature and that a fire may be occurring.

SUMMARY

At least one embodiment relates to a fire detection and suppression system for use with including an appliance and a ventilation hood positioned above the appliance. The system includes a first linear heat detector having a first activation temperature, a second linear heat detector having a second activation temperature different than the first activation temperature, a connector assembly electrically coupling the first linear heat detector and the second linear heat detector, a source of fire suppressant at least selectively coupled to at least one nozzle, and a controller coupled to the first linear heat detector and the second linear heat detector and configured to initiate distribution of the fire suppressant through the at least one nozzle in response to receiving an activation signal. The activation signal indicates at least one of (a) the first linear heat detector has reached the first activation temperature or (b) the second linear heat detector has reached the second activation temperature. The connector assembly is configured to be positioned within the ventilation hood.

Another embodiment relates to a fire detection system including a first linear heat detector configured to provide a signal in response to reaching an activation temperature and a connector assembly. The connector assembly includes a body defining a body volume and an aperture, an electrical coupler received within the body volume and electrically coupling the first linear heat detector to at least one of (a) a resistor or (b) a second linear heat detector, and a seal engaging the body and the first linear heat detector to seal the body volume. The first linear heat detector extends through the aperture and into the body volume.

Another embodiment relates to a fire detection system including a first linear heat detector configured to provide a signal in response to reaching an activation temperature and a connector assembly. The connector assembly includes a body defining a body volume and an aperture, and an electrical coupler received within the body volume and electrically coupling the first linear heat detector to at least one of (a) a resistor or (b) a second linear heat detector. The first linear heat detector extends through the aperture and into the body volume. The connector assembly has a maximum operating temperature that is greater than the activation temperature of the first linear heat detector.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Figure 1:
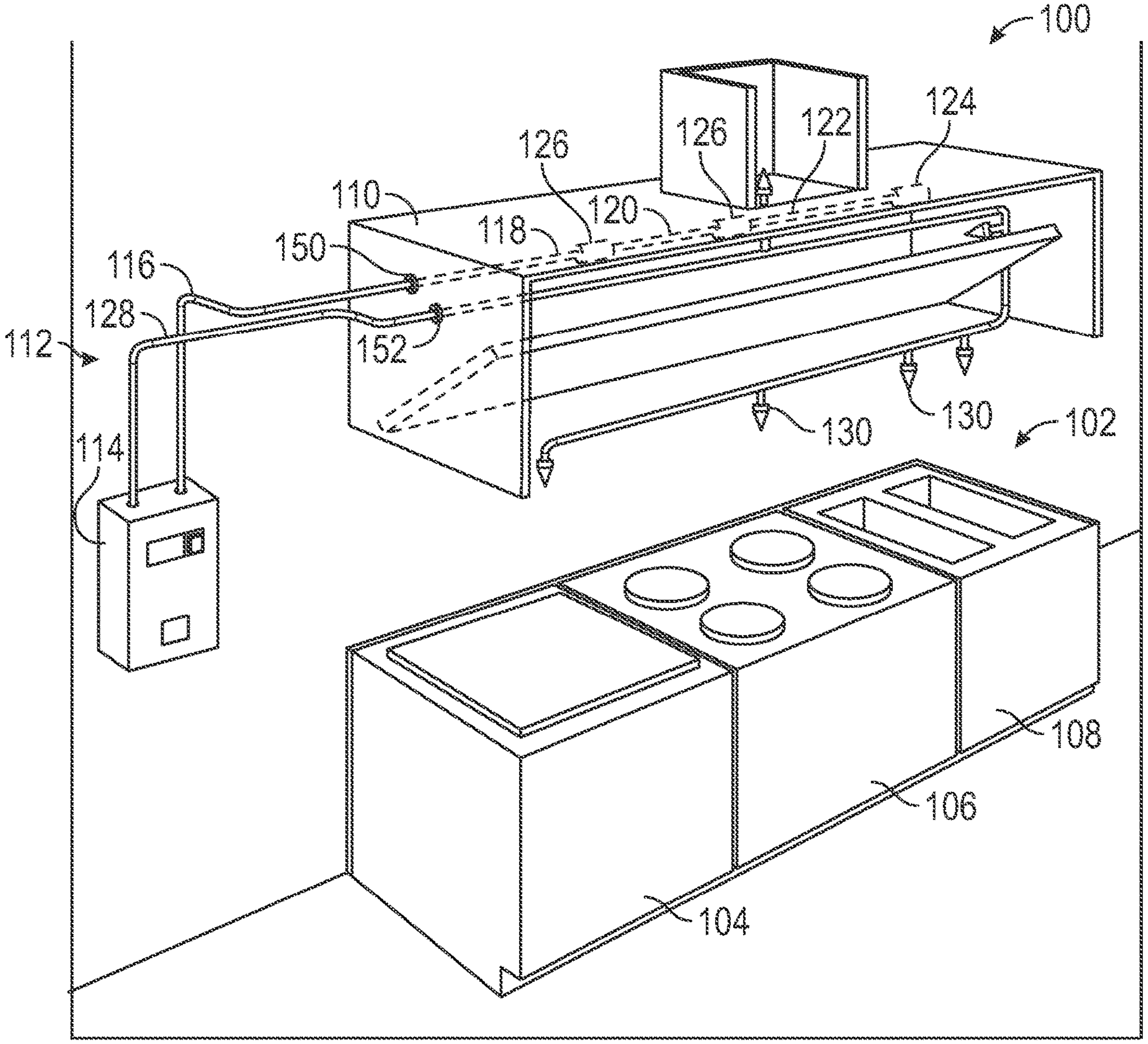
FIG. 1 is a perspective view of a kitchen area including a linear heat detector system according to an exemplary embodiment.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Overview

Referring generally to the figures, a kitchen area or system includes cooking appliances that may generate the same or different amounts of heat to cook different food products. These appliances may include a stove, oven, grill, fryer, etc., or any combination thereof. Each of these appliances may use a different cooking technique (gas, grease, oil, electricity, etc.) to cook the food products. Certain materials (e.g., fluids, etc.) may be subject to ignition/operation at various temperatures. For example, vegetable oil may ignite at a temperature of 795° F., and gas burners may operate at a temperature of 495° F.

The kitchen system can also include an overhead hood. The overheard hood can provide features such as ventilation, fire detection, lighting, and fire suppression. Ventilation systems can remove fumes from and circulate fresh air into desired areas. Fire detection systems can include components such as smoke detectors, infrared sensors, and linear heat detectors usable to determine whether a fire is occurring. Upon detection of a fire, the fire suppression system may be activated to contain the fire. The suppression system can include overhead fluid distribution mechanisms (e.g., a sprinkler, nozzle, diffuser, etc.) that spread an extinguishing material (e.g., water, foam, chemical agent, etc.) to extinguish the fire.

In some kitchen systems, the cooking appliances are positioned in proximity to one another (e.g., located next to, etc.) and share one fire detection system. In such kitchen systems, one linear heat detector may be used for all appliances (e.g., such that a fire at any one of the devices would activate the linear heat detector). In this arrangement, the linear heat detector has a constant activation temperature throughout its length that detects when the temperature anywhere along the length of the linear heat detector meets or exceeds a threshold activation temperature of the heat detector. For example, a kitchen system that includes an oven, an oil fryer, and a grill may use one linear heat detector with an activation temperature of 600° F. Using a single linear heat detector may result in a limited fire detection capability (e.g., in the case where different appliances may operate at relative higher/lower temperatures).

To address fires that occur in a kitchen system with different cooking appliances, various embodiments disclosed herein are directed to a fire detection system including multiple linear heat detectors of different activation temperatures that are used in connection with the multiple different cooking appliances. Specifically, the multiple linear heat detectors may be connected (e.g., in series) using one or more connectors (e.g., linear heat detector connectors) that is capable of withstanding high temperatures (e.g., exceeding 500° F., 600° F., 1000° F., etc.) associated with the cooking processes. The temperature resistance of the connector facilitates placing all components of the circuit (e.g., linear heat detectors, linear heat detector connectors, etc.) directly above the appliances (e.g., heat source). In other systems where connectors are not able to withstand temperatures that meet or exceed the activation temperatures of the linear heat detectors, the connectors may not be capable of being located within the ventilation hood. Instead, the linear heat detection wires may be routed out of the hood such that the connectors can be positioned in a lower temperature area.

Linear heat detectors can be electrically coupled to create a circuit of linear heat detectors of different activation temperatures using one or more connectors. Although a kitchen system is shown herein, the systems and methods shown and described here may be used in other systems or locations. By way of example, the systems and methods described herein may be used to detect and/or suppress fires in other types of buildings (e.g., storage facilities, commercial buildings, etc.), onboard vehicles (e.g., mining vehicles, forestry vehicles, construction equipment, commuter vehicles, etc.), or in other areas.

Kitchen System

Referring now to FIG. 1, a system 100 (e.g., a kitchen system, a cooking area, a room, etc.) is shown according to an exemplary embodiment. System 100 includes a cooking system 102. Cooking system 102 is shown to include appliances 104, 106, and 108. As shown, appliance 104 is a grill, appliance 106 is a range, and appliance 108 is a fryer according to an exemplary embodiment. In alternative embodiments, various other appliances (e.g., oven, microwave, boilers, steamers, etc.) or any combination thereof are included in system 100. In some embodiments, appliances 104, 106, and 108 may use different cooking methods or techniques (e.g., oil, electricity, gas, etc.) and operate at different temperatures to cook food products. Accordingly, appliances 104, 106, and 108 may output differing amounts of thermal energy to the surrounding environment during operation.

Cooking system 102 also includes a ventilation hood or ventilation device, shown as overhead hood 110. Overhead hood 110 is shown to cover an area directly above appliances 104, 106, and 108. In some embodiments, overhead hood 110 may cover a larger area than the top surface area of the appliances. In other embodiments, overhead hood 110 may cover a smaller area than the top surface area of the appliances. In some embodiments, overhead hood 110 can be used to ventilate contaminants (e.g., fumes, food particles, dust, etc.) and/or provide fresh air using an HVAC system. As shown in FIG. 1, overhead hood 110 at least partially encloses or contains fire safety components (e.g., detectors, sprinklers, etc.) of a fire safety system or fire detection and suppression system, shown as fire suppression system 112, according to an exemplary embodiment. In other embodiments, overhead hood 110 may contain additional features (e.g., lighting, appliance control systems, etc.) or any combination thereof.

Still referring to FIG. 1, fire suppression system 112 is shown to include a controller 114, a lead wire assembly 116, linear heat detectors 118, 120, and 122, an end-of-line device 124, linear heat detector connectors 126, a fire suppression material conduit 128, and fluid distribution mechanisms 130 (e.g., nozzles, etc.) according to an exemplary embodiment. In some embodiments, controller 114 may receive inputs (e.g., information, signals, etc.) from linear heat detectors 118, 120, and 122. In some embodiments, the signals from linear heat detectors 118, 120, and 122 may be indicative of an elevated temperature and/or the presence of a fire. In some embodiments, controller 114 may output control commands to drive a fire suppression material or fire suppressant (e.g., foam, water, etc.) through conduit 128 and out fluid distribution mechanisms 130 to address a fire. By way of example, in response to an indication from one or more of linear heat detectors 118, 120, 122 that a fire is present at one of the appliances, controller 114 may output a signal to a valve that then fluidly couples a supply (e.g., a pressurized tank) of fire suppressant to conduit 128. In some embodiments, controller 114 may include a user interface (e.g., a touchscreen interface, one or more buttons or manual actuation devices, etc.) configured to supply information to a user and/or receive information (e.g., commands) from a user.

Lead wire assembly 116 is shown to electrically couple linear heat detector 118 to controller 114 according to an exemplary embodiment. By way of example, lead wire assembly 116 may include one or more conductors (e.g., wires). In some embodiments, assembly 116 may be configured to transmit energy (e.g., electrical energy, etc.), control commands (e.g., outputs from controller 114, etc.), and/or input signals (e.g., signals from linear heat detectors 118, 120, and 122). In other embodiments, assembly 116 may include additional features (e.g., communications interfaces, etc.) or any combination of features.

In some embodiments, lead wire assembly 116 may be part of a series circuit of linear heat detectors configured to detect an elevated temperature and/or the presence of a fire. In an alternative embodiment, linear heat detector 118 may be wired directly into controller 114. As shown, linear heat detector 118 is coupled to linear heat detector 120 by a connector 126, and linear heat detector 120 is coupled to linear heat detector 122 by a second connector 126. In some embodiments, detectors 118, 120, and 122 may have the same or different activation temperatures (e.g., corresponding to the type of appliance above which the linear heat detector operates). Detector 122 may be terminated with end-of-line device 124 (e.g., including a resistor, etc.) according to an exemplary embodiment. In some embodiments, detector 122 may be coupled to additional detectors using additional connectors or other components. By way of example, fire suppression system 112 may include any number of linear heat detectors, connectors 126, or end-of-line devices 124.

The circuit including assembly 116, detectors 118, 120, and 122, connectors 126, and end-of-line device 124 are connected in a series configuration according to an exemplary embodiment. In other embodiments, other configurations may be utilized. In some embodiments, the circuit may allow for multiple detectors of different activation temperatures to be used. In some embodiments, the series circuit may allow one continuous circuit of detectors and connectors to be coupled with controller 114. According to an exemplary embodiment, the circuit facilitates individual fire detection of appliances 104, 106, and 108.

Fire suppression system 112 also includes conduit 128 (e.g., a pipe, etc.) configured to deliver a fire suppressant (e.g., water, foam, chemical agent, etc.) to the cooking system 102 to address one or more fires, according to an exemplary embodiment. In some embodiments, the fire suppression material is released through fluid distribution devices 130 (e.g., sprinklers, nozzles, etc.) to cooking system 102. In some embodiments, controller 114 may output a control command to distribute fire suppressant to cooking system 102.

As shown, hood 110 defines an aperture 150, through which linear heat detector 118 extends, and an aperture 152, through which conduit 128 extends. Connectors 126 and end-of-line device 124 are resistant to elevated temperatures and contaminants associated with cooking, and are thus able to be positioned within hood 110. Accordingly, only one aperture 152 is required to connect the linear heat detectors to controller 114. In other systems where connections are not able to be made within a hood, multiple apertures are required to permit the use of multiple linear heat detectors.

Multiple Linear Heat Detector System

Figure 2:
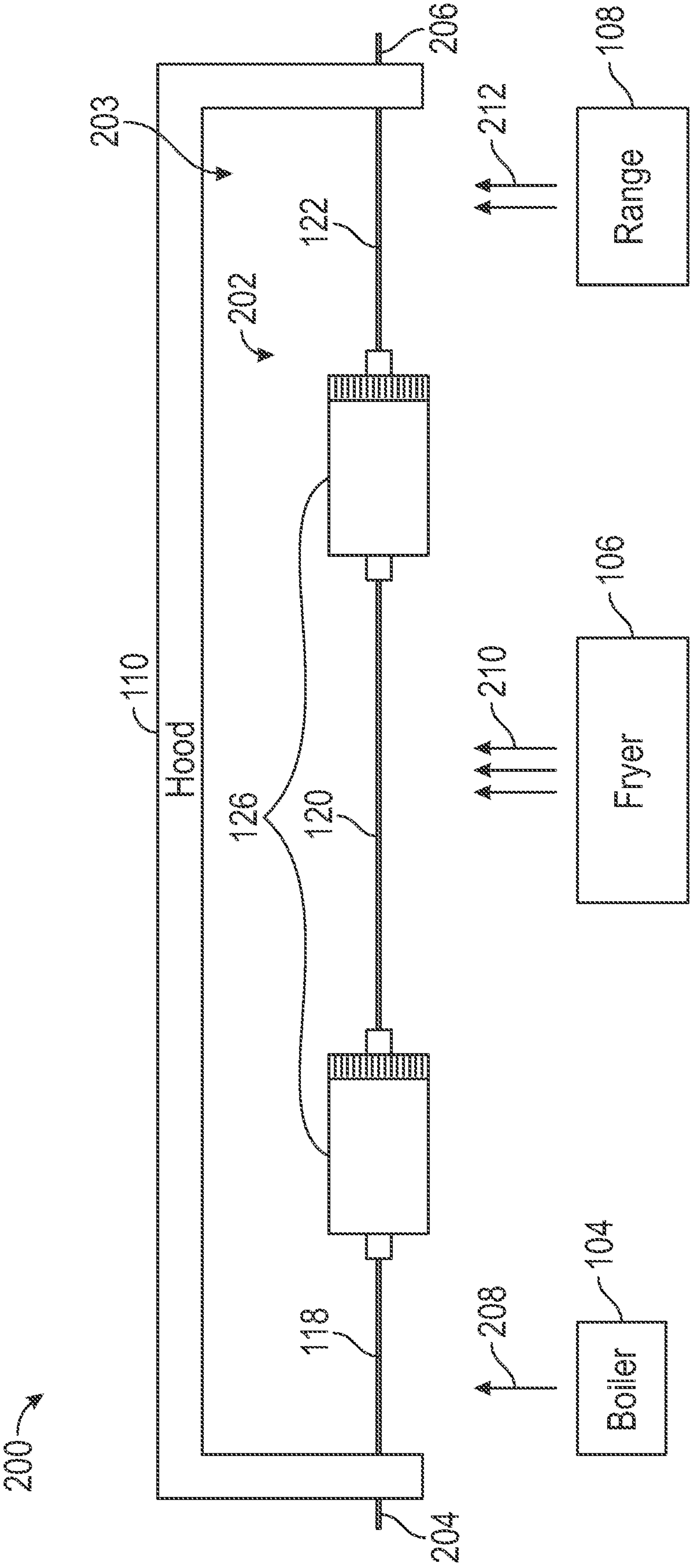
FIG. 2 is a linear heat detector system, according to an exemplary embodiment.

Referring to FIG. 2, a linear heat detector system 200 is shown according to an exemplary embodiment. System 200 is shown to include overhead hood 110 and appliances 104, 106, and 108. Appliances 104, 106, and 108 generate and emit thermal energy, shown as heat 208, 210, and 212. System 200 also includes a linear heat detector circuit 202 according to an exemplary embodiment. Circuit 202 is shown to include linear heat detectors 118, 120, and 122 and connectors 126. Circuit 202 is shown to enter the area under hood 110 at a first aperture 204 and exit the area under hood 110 at a second aperture 206. The entire portion of circuit 202 between first aperture 204 and second aperture 206 is located within the area or volume 203 located between the hood 110 and the appliances 104, 106, and 108 according to an exemplary embodiment. In some embodiments, circuit 202 may include more or fewer linear heat detectors and/or more or fewer connectors. In other embodiments, such as the circuit 700 shown in FIG. 7, the circuit may include an end-of-line device (e.g., resistor, etc.) such as device 124, such that the circuit is terminated within the volume 203. In such embodiments, the second aperture 206 may be omitted.

In some embodiments, linear heat detectors 118, 120, and 122 may have different activation temperatures. By way of example, linear heat detectors 118 and 122 may have the same activation temperature, while linear heat detector 120 may have a different activation temperature. By way of another example, the activation temperature of each linear heat detector may be different. In some embodiments, the activation temperatures of detectors 118, 120, and 122 may be selected based on the operating temperatures or other characteristics associated with appliances 104, 106, and 108. Detector 118 is connected to detector 120 in series and detector 120 is connected to detector 122 in series using linear heat detector connectors 126 to form circuit 202 according to an exemplary embodiment.

Cooking appliance 104 is shown as a boiler, appliance 106 is shown as a fryer, and appliance 108 is shown as a range according to an exemplary embodiment. In some embodiments, other cooking appliances (e.g., stoves, microwaves, toasters, etc.), additional cooking appliances, or any combination thereof may be utilized in connection with linear heat detector system 200. In some embodiments, cooking appliances 104, 106, 108 may generate different amounts of heat 208, 210, and 212. For example, appliance 104 generates low heat 208, appliance 106 generates high heat 210, and appliance 108 generates moderate heat 212 according to one embodiment. In some embodiments, the activation temperatures of linear heat detectors 118, 120, and 122 may correspond to temperatures that exceed those corresponding to the amounts of heat 208, 210, and 212. Circuit 202 is shown to be directly exposed to heat 208, 210, and 212 according to an exemplary embodiment.

Method of Fire Detection

Figure 3:
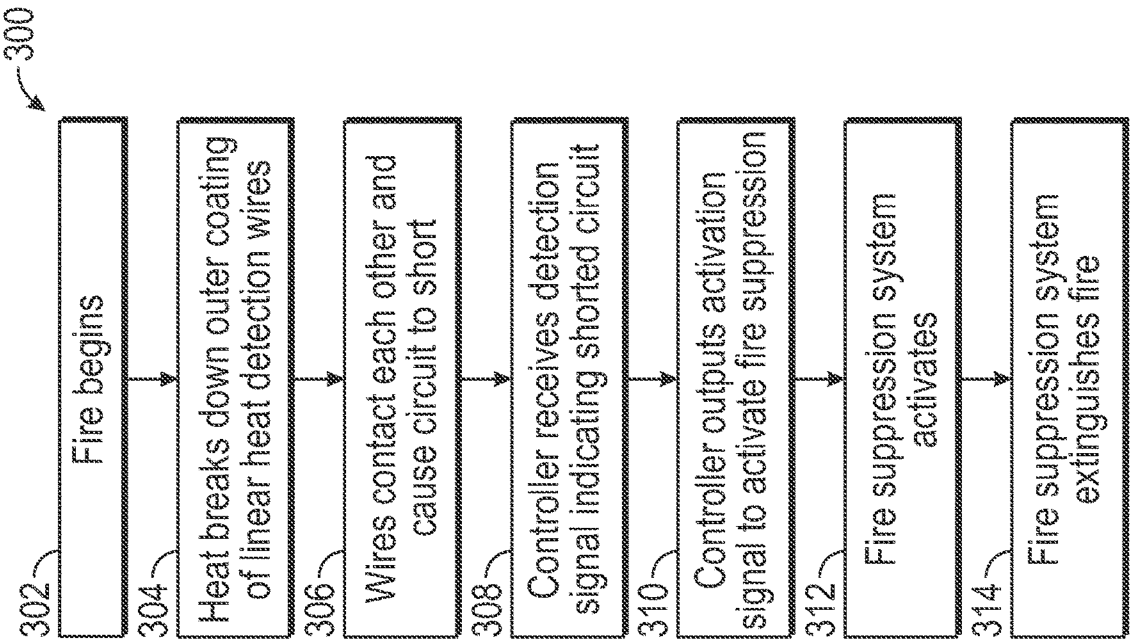
FIG. 3 is a flowchart illustrating a method of fire detection, according to an exemplary embodiment.

Referring to FIG. 3, a process 300 is shown to illustrate a method of fire detection using linear heat detectors according to an exemplary embodiment. Process 300 begins with step 302. Step 302 may involve a fire igniting. In some embodiments, the fire may be ignited at or near an appliance (e.g., stove, oven, fryer, etc.) capable of cooking food products. In some embodiments, the fire may produce elevated temperatures that exceed the operating temperatures of an appliance. Process 300 continues with step 304. Step 304 may involve the heat generated by the fire of step 302 decomposing (e.g., degrading, destructing, melting, etc.) the outer coating of a linear heat detector. In some embodiments, the outer material of the linear heat detector may decompose at an activation temperature of the linear heat detector. In some embodiments, the activation temperature of the linear heat detector may be less than the temperature of the fire of step 302.

Process 300 is shown to continue with step 306. Step 306 may involve the conductive cores of the linear heat detector contacting each other. In some embodiments, linear heat detectors may include two or more conductive cores. In an unactivated state of the linear heat detector, the cores may be separated (e.g., electrically decoupled from one another) by the outer material of the linear heat detector. As the material melts, the cores are permitted to contact one another. In some embodiments, the contact between the conductive cores may be direct, physical contact. In some embodiments, the contact between the conductive cores causes a change in an electrical characteristic (e.g., an overall resistance, a current passing through the circuit, etc.) of the electrical circuit 202 (e.g., such that the circuit 202 is shorted).

Process 300 is shown to continue with step 308. Step 308 may involve a controller receiving a signal of the shorted circuit of step 306 (i.e., a detection signal). In some embodiments, the detection signal may include a change in current flow. In some embodiments, the detection signal includes a change in resistance of the circuit. In other embodiments, the detection signal may include an input signal from an external sensor capable of detecting the shorted circuit. In some embodiments, the controller may be capable of analyzing the location of the shorted circuit from the signal. In other embodiments, the controller 114 may detect a shorted circuit independent of the location of the shorted circuit.

Process 300 is shown to continue with step 310. Step 310 may involve the controller outputting a signal to activate a fire suppression system (i.e., an activation signal). In some embodiments, the activation signal may be transmitted to an external controller capable of controlling a fire suppression system. In other embodiments, the activation signal is transmitted directly from the controller to the fire suppression system. Process 300 continues with step 312. Step 312 may involve activation of a fire suppression system. In some embodiments, a fire suppressant may be transferred through a conduit to the location of the fire. In some embodiments, activation may involve actuating a pump, a valve, or another component (e.g., a container of pressurized gas, etc.) that initiates flow of the fire suppression material. Process 300 ends with the fire suppression system suppressing and/or extinguishing the fire.

Figure 4:
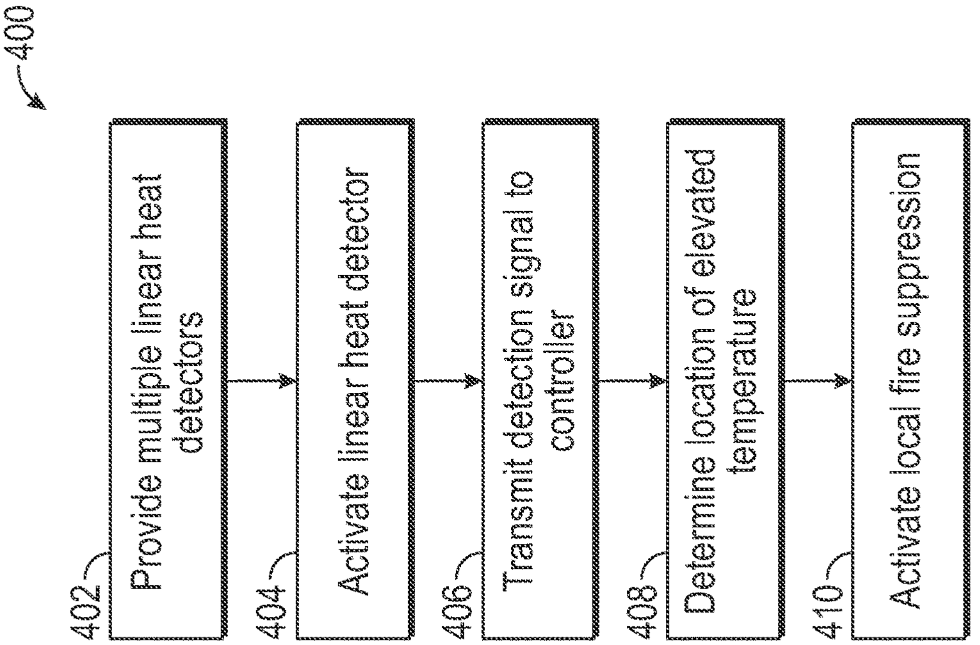
FIG. 4 is a flowchart illustrating a method of fire detection, according to another exemplary embodiment.

Referring now to FIG. 4, a process 400 is shown to illustrate a method of fire detection using multiple linear heat detectors according to an exemplary embodiment. Process 400 begins with step 402. Step 402 involves providing multiple linear heat detectors. The multiple linear heat detectors may be wired in a series circuit similar to circuit 202 of FIG. 2. The multiple linear heat detectors may be connected using one or more linear heat detector connectors. In some embodiments, the connectors may be capable of withstanding direct exposure to an elevated temperature. Process 400 continues with step 404. Step 404 is shown to involve the activation of at least one linear heat detector. In some embodiments, activating at least one linear heat detector may be similar to steps 304 and 306 of FIG. 3.

Process 400 continues with step 406. Step 406 involves transmitting a detection signal to a controller. In some embodiments, the controller may be similar to controller 114 of FIG. 1. In some embodiments, the detection signal may include a change in current flow. In some embodiments, the detection signal includes a change in resistance of the circuit. In other embodiments, the signal may include an input signal from an external sensor capable of detecting the shorted circuit. In some embodiments, the signal may indicate the presence of an elevated temperature.

Process 400 continues with step 408. Step 408 involves determining the location of an elevated temperature. In some embodiments, determining the location of the elevated temperature may include determining the location of a fire. In some embodiments, determination of the location may involve a controller analyzing the location of a shorted circuit. In other embodiments, the location of an elevated temperature may not be determined.

By way of example, a circuit (e.g., the circuit 202) may include multiple linear heat detectors each connected in series, with a resistor (e.g., resistor 850) completing the circuit. When the linear heat detectors are in a normal, non-activated state, the circuit 202 may have a first resistance associated with current flow through each of the linear heat detectors and the resistor. When a first one of the linear heat detectors is activated, a short may be experienced within the first linear heat detector (e.g., the linear heat detector 504), changing the overall resistance of the circuit to a second resistance associated with current flow through the first linear heat detector and the second linear heat detector, but not through the resistor. When the second linear heat detector (e.g., the linear heat detector 502) is activated, a short may be experienced within the second linear heat detector, changing the overall resistance of the circuit to a resistance associated with current flow through the second linear heat detector, but not through the first linear heat detector or the resistor. Using the resistance of the circuit (e.g., or a property associated with the resistance, such as a current flowing through the circuit at a fixed voltage), controller 114 may determine if and where a fault has occurred, and accordingly the location of the fire that caused the fault.

Process 400 continues with step 410. Step 410 involves activating a local fire suppression system, or a local portion or component of a fire suppression system. In some embodiments, activating a local fire suppression system may involve a controller outputting a signal to activate a suppression system similar to step 310 of FIG. 3. In some embodiments, activating a local fire suppression system may involve delivering a fire suppression material through a conduit to a location of the elevated temperature. In some embodiments, activation may involve actuating a pump or other component capable of pressurizing a fire suppression material.

Linear Heat Detector Connector

Figure 5:
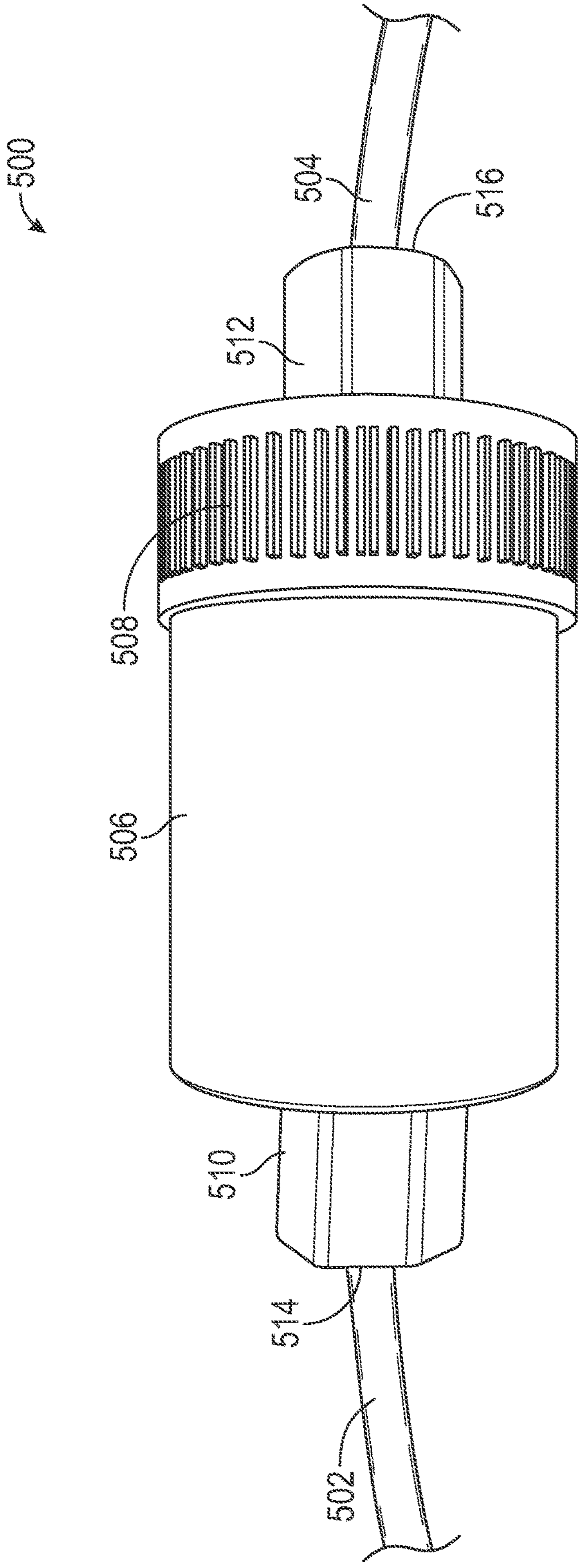
FIG. 5 is perspective view of a linear heat detector connector, according to an exemplary embodiment.

Referring to FIG. 5, an assembled view of a linear heat detector connector 500 is shown according to an exemplary embodiment. Connector 500 may be the same as or similar to linear heat detector connectors 126 shown in FIGS. 1 and 2. Connector 500 is shown to couple (e.g., electrically, etc.) a first linear heat detector 502 with a second linear heat detector 504 (e.g., which may be the same as or similar to the linear heat detectors 118, 120, 122). Detectors 502, 504 may including any of the features of the linear heat detectors shown and described herein. Connector 500 includes a first end cap 510, a second end cap 512, a central body 506, and a body cap 508 according to an exemplary embodiment. In some embodiments, end caps 510 and 512, central body 506, and body cap 508 may be produced from a material capable of withstanding high temperatures (e.g., temperatures greater than 500° F., or 600° F., etc.) generated by a fire. In other embodiments, end caps 510 and 512, central body 506, and body cap 508 may be produced from a combination of different materials capable of withstanding temperatures generated by a fire.

Linear heat detectors 502 and 504 are coupled within central body 506 according to an exemplary embodiment. Detector 502 is shown to enter first end cap 510 through a first end cap aperture 514 and continue into central body 506. Detector 504 is shown to enter second end cap 512 through a second end cap aperture 516 and continue to central body 506. Detectors 502 and 504 may couple with connector 500 within central body 506. In some embodiments, the first end cap aperture 514 is aligned with second end cap aperture 516.

In some embodiments, end cap 510 may be removably coupled (e.g., via a threaded connection, magnetic, etc.) with central body 506, and end cap 512 may be removably coupled with body cap 508. In other embodiments, end caps 510 and 512 may be permanently coupled (e.g., soldered, adhered, etc.) with central body 506 and body cap 508. In some embodiments, end caps 510 and 512 may be formed of a desired cross-sectional shape (e.g., cylindrical, hexagonal prism, etc.). The shapes and/or surface finish of end caps 510 and 512 may facilitate applying a torque to tighten or loosen the threaded connections of the end caps with central body 506 and body cap 508.

In some embodiments, linear heat detectors 502 and 504 are directly coupled to one another within central body 506. In other embodiments, detectors 502 and 504 are indirectly coupled to one another through another component (e.g., a connector, an electrical conductor, terminal block, etc.). In some embodiments, detectors 502 and 504 may be coupled to complete a circuit in series capable of conducting electrical current. In some embodiments, detectors 502 and 504 may have different activation temperatures.

Central body 506 is shown to include a cylindrical structure. In some embodiments, central body 506 may include a different-shaped structure (e.g., cube, hexagonal prism, etc.). In some embodiments, central body 506 may be configured to prevent contaminants (e.g. smoke, grease, dust) from entering the body with sealing components.

Body cap 508 is shown to couple with central body 506 and end cap 512. In some embodiments, body cap 508 may be removably coupled (e.g. via a threaded fastening, a magnetic connection, etc.) with central body 506 to allow selective access inside an internal volume, shown as body volume 509, defined within central body 506. Body cap 508 is shown to include a knurled exterior surface to facilitate applying a torque to tighten or loosen body cap 508 (e.g., by hand). In other embodiments, body cap 508 may include other textured features (e.g., etching, sanding, etc.). In some embodiments, body cap 508 may be formed of a desired cross-sectional shape (e.g., hexagonal, etc.) that facilitates applying a torque to tighten or loosen the threaded connections between central body 506 and body cap 508.

Figure 6:
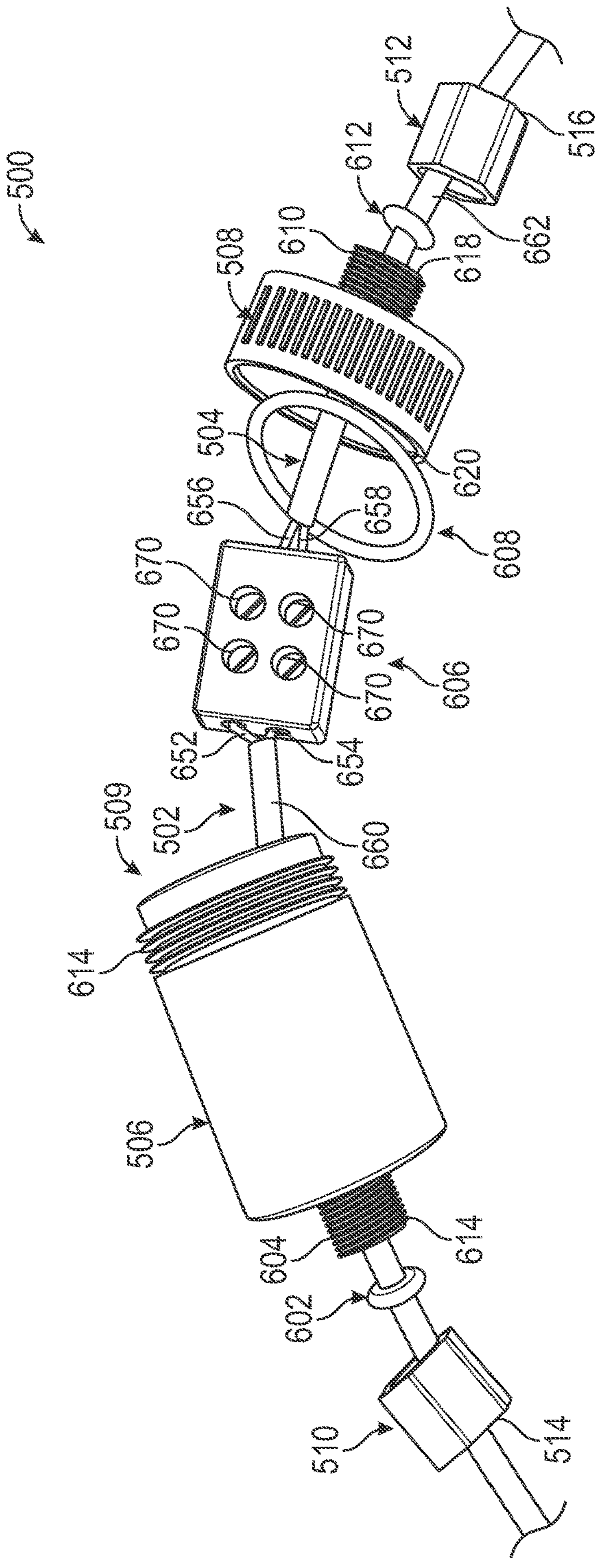
FIG. 6 is an exploded view of the connector of FIG. 5.

Referring now to FIG. 6, an exploded view of linear heat detector connector 500 is shown according to an exemplary embodiment. Connector 500 is shown to include sealing bodies 602, 608, and 612, protruded couplers 604 and 610, a coupler 606, and threaded system 614.

Sealing bodies 602, 608, and 612 (e.g., sealing members, seals, O-rings, etc.) are produced from rubber or a similar compliant material according to an exemplary embodiment. In some embodiments, sealing bodies 602, 608, and 612 may be produced from other materials (e.g., metal, polymer, composites, etc.). Sealing bodies 602, 608, and 612 are shown to include a toroidal shape according to an exemplary embodiment. In some embodiments, sealing bodies 602, 608, and 612 may include other shapes (e.g., disk, square, etc.).

In some embodiments, sealing bodies 602, 608, and 612 may be capable of sealing end cap apertures 514 and 516 and a body cap aperture 618. Sealing body 602 may engage and form a seal between coupling end cap 510, protruding coupler 604, and linear heat detector 502. Sealing body 608 may engage and form a seal between central body 506 and body cap 508. Sealing body 612 may engage and form a seal between end cap 512, protruding coupler 610, and linear heat detector 504. In some embodiments, sealing bodies 602, 608, and 612 may be configured to seal the body volume 509 from the surrounding atmosphere, preventing the ingress of solids and liquids. During operation, cooking appliances (e.g., fryers, grills, stoves, etc.) may introduce contaminants, such as water, grease, or oil, into the air surrounding the appliance. Such contaminants are drawn upward and into the associated ventilation hoods (e.g., by forced air systems within the hoods). By placing linear heat detectors and the associated connectors within the hood, the connectors are continuously subjected to these contaminants. Sealing bodies 602, 608, and 612 prevents these contaminants from entering body volume 509 and interfering with or damaging the connection between linear heat detectors 502, 504. Accordingly, the sealed arrangement of the connector 500 facilitates placement of the connector 500 within ventilation hood. Other connectors without this sealed arrangement may be susceptible to ingress of contaminants, and thus must be placed outside of the ventilation hood, increasing the complexity of installation. In some embodiments, sealing bodies 602 and 612 may indirectly couple linear heat detectors 502 and 504 and end caps 510 and 512.

Connector 500 is shown to include protruding couplers 604 and 610 according to an exemplary embodiment. In some embodiments, protruding couplers 604 and 610 may be capable of coupling end cap 510 with central body 506 and end cap 512 with body cap 508. In some embodiments, protruding couplers 604 and 610 may include a threaded system for coupling end cap 510 with central body 506 and end cap 512 with body cap 508. By tightening these threaded connections, sealing bodies 602 and 612 may be compressed, further increasing their sealing effectiveness. In other embodiments, protruding couplers 604 and 610 may utilize other methods of coupling (e.g., soldering, adhering, etc.).

Central body 506 includes coupling region 614 (e.g., an exterior threaded surface corresponding to an interior threaded surface of body cap 508) capable of fastening body cap 508 to central body 506 according to an exemplary embodiment. In some embodiments, coupling region 614 may include a threaded system capable of coupling body cap 508 with central body 506. By tightening this threaded connection, sealing body 608 may be compressed, further increasing its sealing effectiveness. In other embodiments, coupling region 614 may utilize other methods of coupling (e.g., soldering, adhering, etc.).

Connector 500 is shown to include coupler 606 (e.g., an electrical coupler, a ceramic terminal block, etc.) that electrically couples linear heat detectors 502 and 504 to complete a single circuit according to an exemplary embodiment. Coupler 606 may be positioned within the body volume 509. In some embodiments, coupler 606 may be produced at least in part from a high-temperature resistant material (e.g., ceramic). In some embodiments, coupler 606 may be capable of conducting electricity between linear heat detectors 502 and 504. By way of example, coupler 606 may include one or more conductive contacts that engage linear heat detectors 502 and 504 and conduct electrical energy therethrough. In other embodiments, coupler 606 directly couples linear heat detectors 502 and 504 in direct physical contact with one another. In some embodiments, coupler 606 may electrically couple detectors 502 and 504 to form a single series circuit.

Each component of connector 500 may be configured to withstand high temperatures (e.g., temperatures greater than 500° F., or 600° F., etc.) generated by a fire. Specifically, connector 500 may continue to operate normally, electrically coupling the linear heat detectors, until the air surrounding connector 500 exceeds a maximum operating temperature. After exceeding the maximum operating temperature, connector 500 may start to degrade and stop operating as intended (e.g., breaking one of the desired seals, electrically decoupling the linear heat detectors, etc.). In some embodiments, the maximum operating temperature of connector 500 is at least 500° F. In some embodiments, the maximum operating temperature of connector 500 is at least 600° F. Other connectors have lower maximum operating temperatures, and are thus able to operate as intended when exposed to the temperatures experienced within a ventilation hood.

In the embodiment shown in FIG. 6, each of the linear heat detectors 502, 504 include a pair of conductors or cores, shown as wires 652, 654, 656, 658. The wires 652 and 654 are electrically isolated from one another by an outer layer of material, shown as insulation 660. Similarly, the wires 656, 658 are electrically isolated from one another by an outer layer of material, shown as insulation 662. The insulation 660 is configured to decompose (e.g., deform, melt, etc.) at the activation temperature of linear heat detector 502, placing wire 652 in contact and direct electrical communication with wire 654. Similarly, insulation 662 is configured to decompose at the activation temperature of linear heat detector 504, placing wire 656 in contact and direct electrical communication with wire 658. Within connector 500, a portion of insulation 660 and insulation 662 are stripped away to expose wires 652, 654, 656, 658. Wires 652, 654, 656, 658 are each inserted through separate apertures defined by coupler 606 and held in place by fasteners, shown as screws 670. With screws 670 tightened, wire 652 is electrically coupled to wire 656, and wire 654 is electrically coupled to wire 658.

Figure 8:
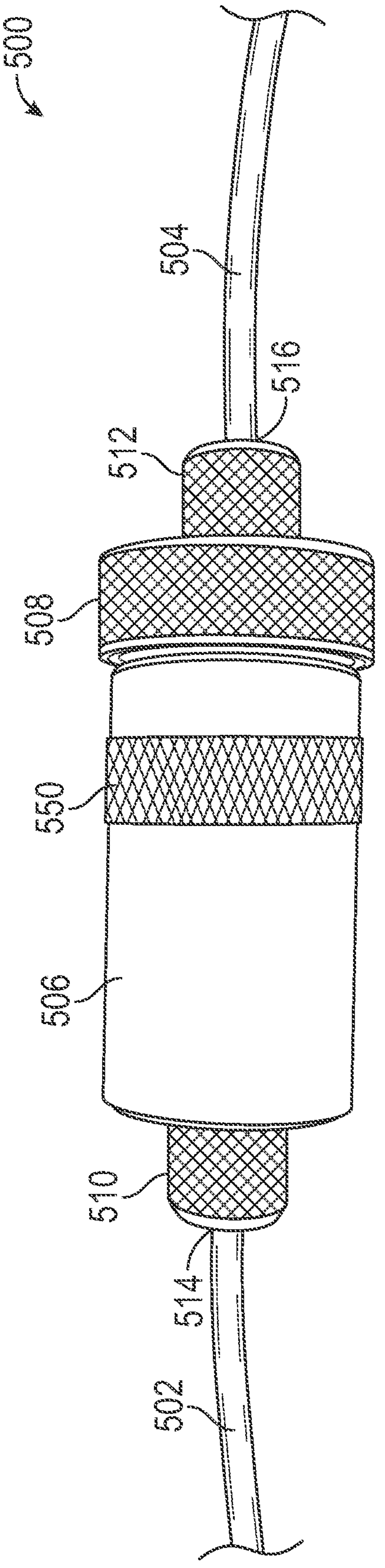
FIG. 8 is perspective view of a linear heat detector connector, according to an exemplary embodiment.
Figure 9:
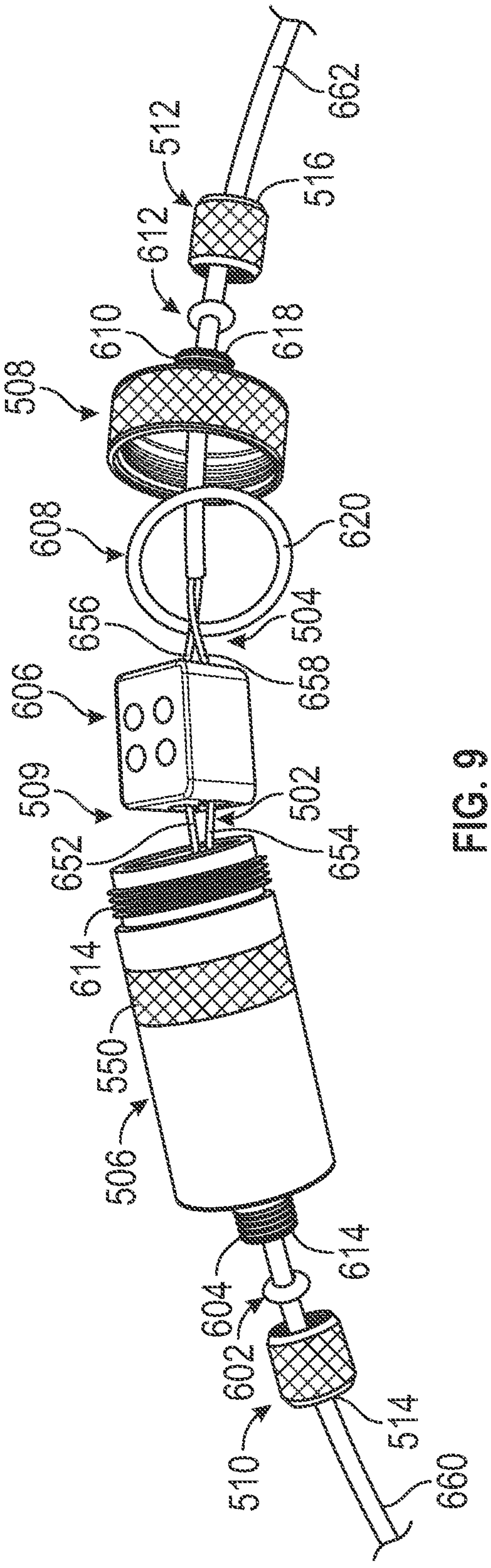
FIG. 9 is an exploded view of the connector of FIG. 8.

FIGS. 8 and 9 illustrate an alternative embodiment of connector 500. This embodiment may be substantially similar to the embodiment of FIGS. 5 and 6, except as otherwise described herein. In this embodiment, end caps 510, 512 are cylindrical and have a textured (e.g., knurled) outer surface to facilitate applying a torque to the end caps. Central body 506 includes a textured (e.g., knurled) outer surface, shown as knurled surface 550, that facilitates applying a torque to central body.

Figure 7:
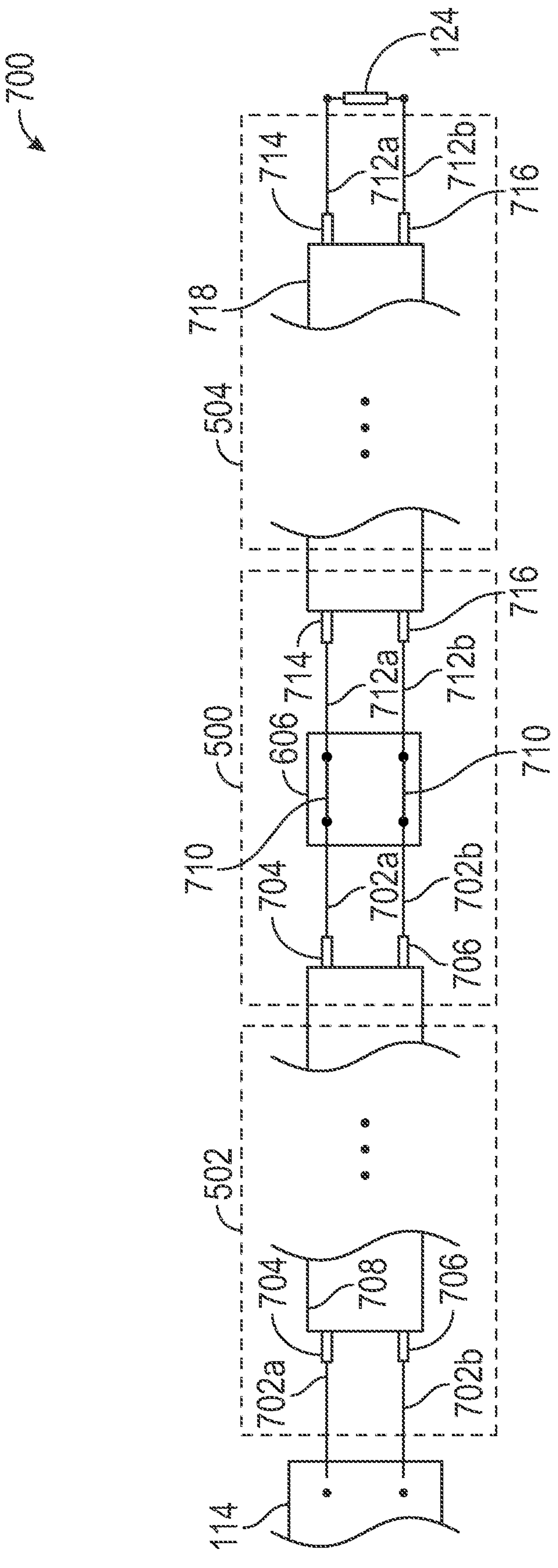
FIG. 7 is a circuit diagram illustrating the system of FIG. 2 according to an exemplary embodiment.

Referring to FIG. 7, a heat detector circuit 700 is shown according to an exemplary embodiment. Circuit 700 is shown to include controller 114, end-of line device 124, one or more heat detector connectors 500, and linear heat detectors 502 and 504. Detector 502 is shown to include two conductive cores **702*a* and 702*b*. Conductive cores 702 are shown to be coupled (e.g., electrically, etc.) with controller 114. In some embodiments, core 702*a* may be covered with a coating 704 and core 702*b* may be covered with a coating 706. In some embodiments, coatings 704 and 706 may include a material capable of electrical insulation (e.g., a polymer material, etc.). In further embodiments, coatings 704 and 706 may have an activation temperature at which the material decomposes. In other embodiments, coatings 704, 706** are omitted.

In some embodiments, coatings 704 and 706 may be covered with an outer jacket 708. Jacket 708 may include a material capable of electrical insulation (e.g., a polymer material, etc.). In some embodiments, outer jacket 708 does not decompose in response to reaching the activation temperature of coatings 704 and 706. Rather, outer jacket 708 remains intact to ensure that cores 702 are held in close proximity to one another. In other embodiments, jacket 708 may have an activation temperature at which the material decomposes. In such embodiments, the activation temperature of jacket 708 may be similar to the activation temperature of coatings 704 and 706. In some embodiments, the coatings 704 and 706 may be twisted (e.g., braided) within jacket 708. In further embodiments, the activation temperatures of coatings 704 and 706 and jacket 708 may cause the material of coatings 704 and 706 and jacket 708 to decompose (e.g., melt). In some embodiments, the decomposed material may cause conductive cores **702*a* and 702*b* to couple (e.g., physically, electrically, etc.). In some embodiments, the coupling of conductive cores 702*a* and 702*b* may cause circuit 700** to short.

Linear heat detector 504 is shown to include conductive cores **712*a* and 712*b*, coatings 714 and 716, and outer jacket 718. In some embodiments, conductive cores 712 are shown to couple (e.g., physically, electrically, etc.) with end-of-line device 124 (e.g., including a resistor). In other embodiments, conductive cores 712 may be wired into additional detectors using additional connectors. In some embodiments, core 712*a* may be covered with coating 714, and core 712*b* may be covered with coating 716. In some embodiments, coatings 714 and 716 may be twisted (e.g., braided) within jacket 718. In some embodiments, the components of detector 504 may include similar features (e.g., activation temperature, conductance, materials, etc.) as the components of detector 502. In other embodiments, the components may include one or more different features as the components of detector 502** (e.g., a different activation temperature).

Connector 500 is shown to include coupler 606. Coupler 606 couples (e.g., physically, electrically) the conductive cores 702 with conductive cores 712 using contacts 710 according to an exemplary embodiment. In some embodiments, contacts 710 may include a material capable of conducting electricity. In some embodiments, coupler 606 includes a material capable of withstanding elevated temperatures. In some embodiments, the material of coupler 606 may be capable of withstanding the activation temperatures of outer coatings 704, 706, 715, and 716 and jackets 708 and 718. In various alternative embodiments, circuit 700 may include more or fewer components than those shown in FIG. 7. For example, additional connectors and heat detectors may be utilized to provide for additional local heat detection. Circuit 700 provides an integrated fire detection circuit configured to detect elevated temperatures at various locations, and employs connectors suitable for use within such high temperature environments that are sealed to avoid ingress of undesirable materials (e.g., smoke particles, debris, cooking grease or other fluids, etc.).

Figure 10:
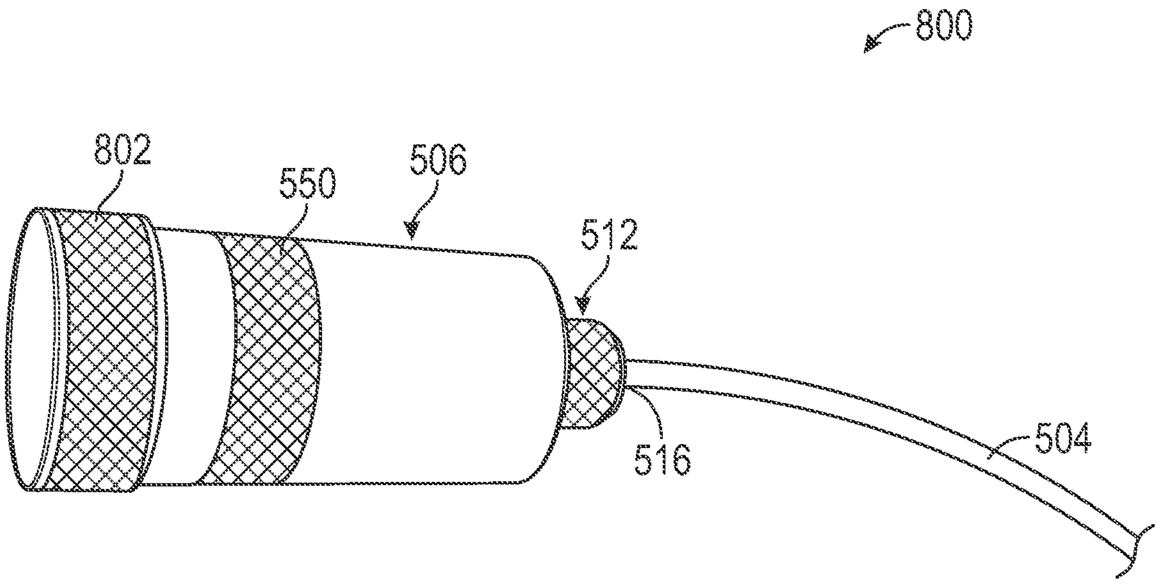
FIG. 10 is perspective view of a linear heat detector connector, according to an exemplary embodiment.
Figure 11:
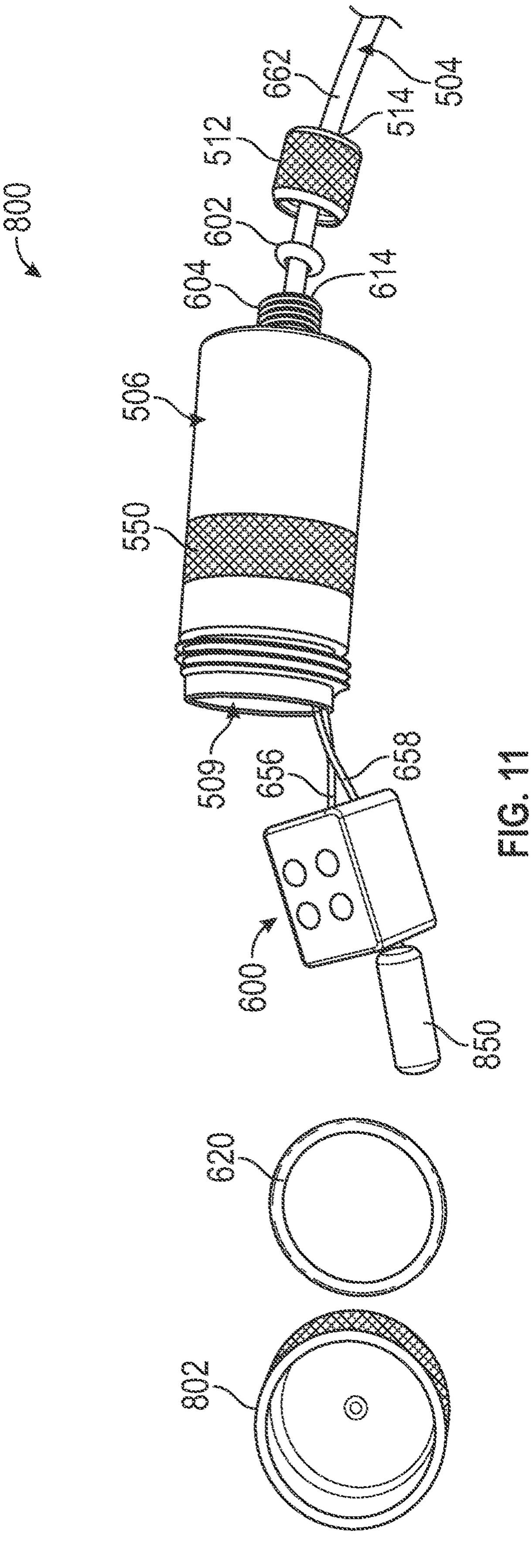
FIG. 11 is an exploded view of the connector of FIG. 5.

Referring to FIGS. 10 and 11, an end-of-line device (e.g., a linear heat detector connector or connector assembly) is shown as connector 800. Connector 800 may be the same as or similar to end-of-line device 124. The construction of connector 800 may be substantially similar to that of connector 500 of FIGS. 8 and 9 except as otherwise specified herein. In connector 800, body cap 508 is replaced with a body cap 802. Body cap 802 omits protruded coupler 610, instead having a flat sealed end. Connector 800 and connector 500 may be similarly sealed and may have similar resistances to high temperatures. Accordingly, connector 800 may placed within a ventilation hood without being damaged by elevated temperatures or contaminants associated with operation of a corresponding appliance.

As shown in FIG. 11, connector 800 includes an end-of-line device or circuit terminator (e.g., a conductor, a resistor, etc.), shown as resistor 850. Resistor 850 is electrically coupled to connector 600. Connector 600 electrically couples resistor 850 to wire 656 and wire 658, such that resistor 850 completes the circuit shown in FIG. 7, according to an exemplary embodiment. Resistor 850 may be configured to withstand the elevated temperatures experienced by connector 800 (e.g., greater than 500° F., greater than 600° F., etc.). In some embodiments, resistor 850 has a predetermined resistance. The resistance of resistor 850 may stay substantially constant throughout the range of operating temperatures experienced by connector 800.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the [apparatus, system, assembly, etc.] as shown in the various exemplary embodiments is illustrative only. Additionally, any element disclosed in one embodiment may be incorporated or utilized with any other embodiment disclosed herein. For example, the second end cap 512 of the exemplary embodiment shown in at least FIG. 5 may be incorporated in the connector 800 of the exemplary embodiment shown in at least FIG. 10. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A fire detection and suppression system for use with an appliance and a ventilation hood positioned above the appliance, the system comprising:

a first linear heat detector having a first activation temperature;

a second linear heat detector having a second activation temperature different than the first activation temperature;

a connector assembly electrically coupling the first linear heat detector and the second linear heat detector;

a source of fire suppressant at least selectively coupled to at least one nozzle; and a controller coupled to the first linear heat detector and the second linear heat detector and configured to initiate distribution of the fire suppressant through the at least one nozzle in response to receiving an activation signal, the activation signal indicating at least one of:

(a) the first linear heat detector has reached the first activation temperature; or (b) the second linear heat detector has reached the second activation temperature, wherein the connector assembly is configured to be positioned within the ventilation hood.

2. The fire detection and suppression system of claim 1, wherein the connector assembly has a maximum operating temperature that is greater than the first activation temperature and the second activation temperature.

3. The fire detection and suppression system of claim 2, wherein the maximum operating temperature of the connector assembly is greater than 500° F.

4. The fire detection and suppression system of claim 2, wherein the connector assembly includes a body defining a body volume, wherein the first linear heat detector and the second linear heat detector extend within the body volume, and wherein the connector assembly engages both the first linear heat detector and the second linear heat detector to seal the body volume.

5. The fire detection and suppression system of claim 1, wherein the connector assembly includes a body defining a body volume, wherein the first linear heat detector and the second linear heat detector extend within the body volume, and wherein the connector assembly engages both the first linear heat detector and the second linear heat detector to seal the body volume.

6. The fire detection and suppression system of claim 5, wherein the connector assembly further includes an electrical coupler positioned within the body volume, wherein the electrical coupler electrically couples the first linear heat detector to the second linear heat detector.

7. The fire detection and suppression system of claim 1, further comprising a second connector assembly including a resistor, wherein the second linear heat detector includes a first wire and a second wire, wherein the second connector assembly is electrically coupled to the second linear heat detector such that the first wire, the resistor, and the second wire are connected in series, and wherein the second connector assembly is configured to be positioned within the ventilation hood.

8. The fire detection and suppression system of claim 7, further comprising a third linear heat detector electrically coupling the second linear heat detector to the second connector assembly.

9. The fire detection and suppression system of claim 1, wherein the connector assembly includes:

a body defining a body volume and an aperture, wherein the first linear heat detector extends through the aperture and into the body volume;

an electrical coupler received within the body volume and electrically coupling the first linear heat detector to the second linear heat detector; and a seal engaging the body and the first linear heat detector to seal the body volume.

10. The fire detection and suppression system of claim 9, wherein the body includes a main body selectively coupled to a body cap, and wherein the body volume is defined between the main body and the body cap.

11. The fire detection and suppression system of claim 10, wherein the connector assembly further comprises a second seal engaging the main body and the body cap to seal the body volume.

12. The fire detection and suppression system of claim 11, wherein the aperture is a first aperture, wherein the main body defines the first aperture, wherein the body cap defines a second aperture, wherein the second linear heat detector extends through the second aperture and into the body volume, and wherein the connector assembly further comprises a third seal engaging the body cap and the second linear heat detector to seal the body volume.

13. The fire detection and suppression system of claim 9, wherein the connector assembly has a maximum operating temperature that is greater than the first activation temperature of the first linear heat detector.

14. The fire detection and suppression system of claim 1, wherein the connector assembly includes:

a body defining a body volume and an aperture, wherein the first linear heat detector extends through the aperture and into the body volume; and an electrical coupler received within the body volume and electrically coupling the first linear heat detector to the second linear heat detector, wherein the connector assembly has a maximum operating temperature that is greater than the first activation temperature of the first linear heat detector.

15. The fire detection and suppression system of claim 14, wherein the maximum operating temperature of the connector assembly is greater than 500° F.

16. The fire detection and suppression system of claim 14, wherein the maximum operating temperature is greater than the second activation temperature.

* * * * *